United States Patent
Zikeli et al.

(10) Patent No.: US 10,557,668 B2
(45) Date of Patent: Feb. 11, 2020

(54) PIPE SYSTEM INCLUDING INTERNAL HEAT EXCHANGERS

(75) Inventors: Stefan Zikeli, Regau (AT); Friedrich Ecker, Timelkam (AT)

(73) Assignee: AUROTEC GMBH, Regau (AT)

( * ) Notice: Subject to any disclaimer, the term of this patent is extended or adjusted under 35 U.S.C. 154(b) by 289 days.

(21) Appl. No.: 14/241,631

(22) PCT Filed: Sep. 3, 2012

(86) PCT No.: PCT/EP2012/067080
§ 371 (c)(1),
(2), (4) Date: Jul. 11, 2014

(87) PCT Pub. No.: WO2013/030402
PCT Pub. Date: Mar. 7, 2013

(65) Prior Publication Data
US 2014/0326329 A1    Nov. 6, 2014

(30) Foreign Application Priority Data

Sep. 2, 2011 (EP) .................................. 11179852
Jan. 5, 2012 (CN) ..................... 2012 2 0002237 U

(51) Int. Cl.
F28D 7/08 (2006.01)

(52) U.S. Cl.
CPC ......... F28D 7/085 (2013.01); *Y10T 137/6579* (2015.04)

(58) Field of Classification Search
CPC . F28D 7/08; F28D 7/005; F28D 7/082; F28D 7/085; F28D 2021/0098; F16L 53/002
See application file for complete search history.

(56) References Cited

U.S. PATENT DOCUMENTS 1,645,742 A * 10/1927 Fee, Jr. .................. F28D 7/005
                                                              29/890.035
3,363,672 A * 1/1968 Ohsol .................. F28D 7/0058
                                                              126/343.5 A
(Continued)

FOREIGN PATENT DOCUMENTS

DE          10241276       3/2004
DE    10 2009 043788       3/2011
(Continued)

OTHER PUBLICATIONS

Korean Office Action from corresponding Korean Patent Application No. 10-2014-7008820, dated Aug. 31, 2018.

*Primary Examiner* — Nelson J Nieves
(74) *Attorney, Agent, or Firm* — Greer, Burns & Crain, Ltd.

(57) ABSTRACT

A heat exchanger pipe system is provided for transporting viscous fluids, including a plurality of individual heat exchangers designed as pipe elements and having a predefined control temperature and/or pressure distribution along the pipe system and in the cross-section of the pipes. The heat exchangers, which are in the form of pipe elements, are arranged at regular distances in the pipe system. The regular distances are selected in such a manner that a predetermined temperature and/or pressure distribution is maintained along the pipe system, tempering apparatus of a viscous fluid transported in the heat exchanger pipe are arranged in the heat exchangers and optional mixing elements which are used to maintain, in accordance with the pipe cross-section, a predetermined temperature and pressure distribution in the cross section of the pipes, and at least 30% of the length of the heat exchanger pipe system is equipped with heat exchangers.

15 Claims, 7 Drawing Sheets

(56) References Cited

U.S. PATENT DOCUMENTS

| | | | | |
|---|---|---|---|---|
| 3,451,986 A | * | 6/1969 | Metais | F28D 7/0083 526/346 |
| 3,595,848 A | * | 7/1971 | Reinecke | C08F 14/06 526/344.2 |
| 4,110,521 A | | 8/1978 | Barnett et al. | |
| 4,275,177 A | * | 6/1981 | Walkenhorst | F28D 7/085 165/109.1 |
| 5,046,548 A | * | 9/1991 | Tilly | F28D 7/024 165/140 |
| 5,099,916 A | * | 3/1992 | Vollhardt | F28F 13/08 122/7 R |
| 5,354,371 A | | 10/1994 | Wykes et al. | |
| 6,331,072 B1 | * | 12/2001 | Schierholz | B01F 5/0646 138/177 |
| 7,306,029 B2 | * | 12/2007 | Dobos | F28D 7/0083 165/140 |
| 8,485,230 B2 | * | 7/2013 | Laor | C23C 16/455 138/177 |
| 8,794,820 B2 | * | 8/2014 | Mathys | F28D 7/085 165/157 |
| 2003/0051501 A1 | * | 3/2003 | Matsushima | F28D 7/08 62/435 |
| 2003/0094199 A1 | * | 5/2003 | Roediger | F04B 15/02 137/334 |
| 2003/0217565 A1 | * | 11/2003 | Flynn | C09K 5/045 62/430 |
| 2004/0071605 A1 | | 4/2004 | Coonan et al. | |
| 2004/0085853 A1 | * | 5/2004 | Kohlgruber | B01F 3/10 366/147 |
| 2004/0125691 A1 | * | 7/2004 | Streiff | F28D 7/08 366/337 |
| 2004/0156763 A1 | * | 8/2004 | Wood | B01F 5/0451 422/600 |
| 2005/0061491 A1 | * | 3/2005 | Van Berlo | F22B 31/045 165/146 |
| 2006/0231242 A1 | * | 10/2006 | Hawranek | F28D 1/0233 165/157 |
| 2007/0023163 A1 | * | 2/2007 | Kidwell | F25B 30/06 165/45 |
| 2008/0000623 A1 | * | 1/2008 | Hugues | F28D 7/08 165/158 |
| 2009/0084523 A1 | * | 4/2009 | Cargill | F28D 7/08 165/92 |
| 2009/0117218 A1 | | 5/2009 | Niishimura et al. | |
| 2009/0165994 A1 | * | 7/2009 | Bucher | F28D 7/08 165/47 |
| 2009/0304890 A1 | | 12/2009 | Ni et al. | |
| 2010/0071635 A1 | * | 3/2010 | Moore | F28D 7/08 122/235.14 |
| 2010/0116466 A1 | * | 5/2010 | Hawranek | F28D 1/0233 165/104.19 |
| 2010/0270002 A1 | * | 10/2010 | Parrella | F24J 3/082 165/45 |
| 2011/0108238 A1 | * | 5/2011 | Okonski, Jr. | F28D 7/08 165/85 |
| 2011/0155366 A1 | * | 6/2011 | Brunn | F28D 7/024 165/287 |
| 2011/0224463 A1 | * | 9/2011 | Zikeli | B01J 19/0093 568/940 |
| 2012/0145364 A1 | * | 6/2012 | Oritani | F24F 1/0007 165/121 |
| 2012/0255706 A1 | * | 10/2012 | Tadayon | F28D 20/0039 165/47 |
| 2013/0031900 A1 | * | 2/2013 | Nelson | F28D 7/1607 60/530 |

FOREIGN PATENT DOCUMENTS

| | | | |
|---|---|---|---|
| FR | 1383810 | 1/1965 | |
| FR | 2294324 A1 | * 7/1976 | F28D 7/005 |
| WO | 2005119154 | 12/2005 | |
| WO | 2009122143 | 10/2009 | |

* cited by examiner

PIPE SYSTEM INCLUDING INTERNAL HEAT EXCHANGERS

BACKGROUND

The present invention relates to the use of heat exchangers when transporting unstable fluids.

Pipelines for transporting viscous media, such as for example hot-melting plastics ("hot melts") are known e.g. from US 2009/0321975. A plant is presented therein, in which a viscous polymer is conveyed to an extruder. The polymer melt is cooled in this case by means of a heat exchanger.

A reactor for continuously carrying out a polymerisation reaction in highly viscous media is described in EP 096 201 A1. It was found that the energy expenditure during mixing and heat transfer at high viscosity is so large that chemical reactions can be influenced during the polymerisation. Thus, means for dissipating the reaction heat and limited mixing times for homogenisation are the aim. To this end, the reactor is perfused with a coolant and static mixing components are provided in the interior. Static mixing components are wide-spread and reference is therefore made to the disclosure of U.S. Pat. No. 7,841,765 or WO 2009/000642.

However, it may not only be polymerisation reactions that require dissipation of the reaction heat. Dissolution processes, intermediate storage of the thermally decomposable polymers and polymer solutions also require an actively controlled temperature management, so that the desired products have a corresponding quality on the one hand and on the other hand, the above listed method steps can also be managed safely with respect to temperature. Recently, many efforts have been undertaken so that biodegradable products, such as cellulose fibres, can be produced from spinning solutions on an industrial scale. Spinning or extrusion solutions can be produced both from native polymers (e.g. cellulose and cellulose derivatives) and from bio-based plastics which were obtained by means of comprehensive chemical changing of the biogenic raw materials. On the other hand, one may consider the term biopolymers to mean polymers synthesized by living creatures. These polymers are present in the form of polysaccharides, proteins, nucleic acids. Such spinning solutions can also consist of a mixture of biopolymers, such as cellulose, a solvent, a solubilising component, as well as additives necessary for the process (stabilisers, acids, alkalis) and additives that change product properties. A corresponding representation of such cellulose/amine oxide/water spinning solutions can be drawn from the publication "Structure Formation of Regenerated Cellulose Materials from NMMO-Solutions" (Prog. Polym. Sci. 26 (2001) 1473-1524).

Such polymer solutions generally have a pronounced temperature- and viscosity-sensitive behaviour, to which very close attention must be paid in all process steps, starting with the solution production, that is to say the dissolution of the polymer, through intermediate steps necessary during operation, such as conveying, distribution, filtration, heat exchanging, addition of additives and shaping. The publication "Rheology of Concentrated N-Methylmorpholine-N-Oxide Cellulose Solutions" (Polymer Science, Ser. A Vol. 39, No. 9 1997, pp 1033-1040) deals with the rheology of such polymer compounds in particular.

US 2009/304890 A1 describes a pipeline system made up of a plurality of heat exchangers, which are surrounded with a heat-transfer medium jacket for temperature regulation. Inside, the pipelines are equipped with lamellae, in order to increase the turbulence. Baffle plates can also be provided. US 2009/165994 A1 relates to a heat exchanger with inner heat-transfer-medium conveying structures, which are provided both for heat transport and for thorough mixing. A pipe system for polymerisation of acrylamides is described in U.S. Pat. No. 4,110,521 A, which comprises heat exchangers with a temperature-control jacket and inner static mixers.

U.S. Pat. No. 5,046,548 A shows a heat exchanger with an internal double spiral, which carries the heat-transfer medium. If appropriate, an internal straight return pipeline can also be provided.

WO 2009/122143 A2 relates to a "pulse flow reactor" (PFR) with fittings, which effect an oscillating movement of the through-pumped fluid material. Means for heating the material, such as e.g. a hot water jacket, are also described in this document.

WO 2005/119154 A1 describes a system for heating suspensions with high density, which have a tendency toward laminar flow with low internal heat transfer. The system has a multiplicity of individual heat exchanger units, wherein each heat exchanger has a plurality of inner pipes. The patent publications US 2009/117218 A1, DE 10 2009 043788 A1, DE 102 41 276 A1, FR 1,383,810 A and EP 1 350 560 A1 describe further heat exchangers.

It is established in the previously mentioned publications that temperature and viscosity influences are to be taken into account in the shaping process. Corresponding investigations prove that very close attention must be paid to the shaping to form moulded products, such as staple fibres, filaments, films, mouldings and non-woven materials. The highest demands are placed on the quality of the polymer solution for producing high quality moulded products, as the polymer solution is exposed to the highest load in the shaping process.

In addition to the required quality of the polymer melt, such as temperature and viscosity uniformity, care must also be taken that on the one hand, the polymer solutions are conveyed thermally homogeneously and no thermally induced decomposition of the polymer (cellulose) and also the solvent (amine oxide) takes place in the NMMO (N-Methylmorpholine N-oxide) process for producing moulded products. It is known that autocatalytic decomposition reactions that may occur spontaneously may occur under certain conditions in the case of the previously mentioned cellulose polymer solutions. In the case of reactions of this type, it is also necessary to be able to dissipate the resulting reaction heat in as controlled a manner as possible.

Cellulose/amine oxide/water polymer solutions also have the characteristic of possibly discolouring under the action of heat. This discolouration can be so extensive that the polymer solution changes from being honey-coloured at the start of solution production to being more of a dark-brown to black over the transport path. This discolouration is caused by the thermal load on the polymer and the solvent. A strongly discoloured polymer solution leads to the end product produced at the processing location likewise taking on a dark-brown colour and therefore being unsuitable for commercial sale.

The transport of the highly viscous cellulose solution through pipes on its own leads to frictional heat being induced by the pressure resistance of the pipe (1 to 5 bar/m) and being introduced into the polymer compound. Since polymer solutions produced on a large scale often have impurities, these impurities, e.g. swelling bodies, are eliminated before the processing of the polymer solution by means of filtration. A pressure loss is generated by the filter medium, due to the filtration, which induces additional frictional heat in the polymer compound. In order to bring the polymer solution produced to the individual processing locations, the polymer solution is usually divided via angled pieces, T-pieces, Y-pieces and multiple distributors, which results in a further heat input.

Due to the displacement or conveying of the highly viscous polymer solutions by means of pumps, such as for example gear pumps, extruders, screw pumps, channel pumps, centrifugal pumps, additional frictional heat is induced and contributed to the viscosity and thermally sensitive cellulose solution.

Not only the previously mentioned plant components can contribute frictional heat (i.e. power loss of the devices), but also built-in mixers, such as static mixers for example, pipe mixers, etc., which likewise leads to frictional heat.

A system for transporting polymer solutions, starting from solution production, via pumps, filters, distribution components through to final processing devices, requires complex plant systems, so that all of the previously mentioned sources of frictional heat can be removed from the polymer solution at the location of origin, so that a temperature and viscosity uniformity is achieved for the shaping of the polymer solution, whilst maintaining the highest safety standards.

SUMMARY

The aim of this invention lies in delivering a transport system for the processing of highly viscous fluids, particularly polymer solutions, such as cellulose solutions, which system has the required thermal safety, so that decomposition reactions with exothermic and/or endothermic heat toning and also discolourations can be kept under control and temperature and viscosity homogeneity can be set.

According to the invention, a heat exchanger pipeline system is provided, which is suitable for transporting viscous fluids and has a multiplicity of individual heat exchangers as pipeline components, wherein at least 30% of the length of the heat exchanger pipeline system is equipped with heat exchangers. The system allows a predetermined controlled temperature and/or pressure distribution along the pipeline system, and also in the cross section of the pipelines, e.g. by means of the restratifying of the fluid. At regular spacings along the pipeline system, heat exchangers are provided as pipeline components, wherein the regular spacings are chosen in such a manner in order to maintain a predetermined temperature and/or pressure distribution along the pipeline system. Tempering means are provided in the heat exchangers in order to keep a viscous fluid transported in the heat exchanger pipeline at a predetermined temperature, and also optionally, mixing components 14 (area between dashed lines in FIG. 1) are provided in order to be able, depending on the pipeline cross section, to maintain a predetermined temperature and/or pressure distribution in the cross section of the pipelines, in order therefore to also be able to maintain the viscosity homogeneity.

Pipes for transporting viscous fluids are already known. A pipe is suggested in WO 94/28213 A1 for transporting viscous compounds, namely a cellulose/NMMO solution, in which the fluid can be cooled in the pipe centre and/or at the wall of a pipe segment in accordance with the formulae specified there. To this end, a coolant is conveyed through a cooling jacket surrounding the pipe. The coolant removes the heat from any exothermic reactions that may occur from the working fluid and cools the outer region of the fluid flow. As a result, strongly deviating temperature differences arise between the fluid in the outer region and in the pipe centre, which negatively influence the physical and chemical properties of the fluid.

DE10024540 describes a fluid pipeline component, with an internal cooling component in the form of a concentric pipe. Here also, due to the laminar flow, viscous fluids can form temperature gradients in cross section.

According to the invention, it was found that depending on the internal diameter, a mixing component, e.g. a static mixer, may be necessary in order—depending on the tolerable temperature difference—to maintain the temperature distribution in cross section and thus the viscosity constancy of the polymer compound in a pipeline. In addition, to prevent temperature gradients in the heat exchanger cross section, it is also a goal to achieve a constant temperature in the longitudinal course of the heat exchanger pipeline. Thus, temperature control means according to the invention are provided essentially along the entire heat exchanger pipeline. "Essentially" should be understood as meaning that a temperature control does not have to be present at each and every section of the course, it is possible to bridge short sections without temperature control means without having to fear substantial limitations of the fluid quality and safety of the system. An analysis of the viscosity curve and temperature curve can be used in order to determine the localised use of the temperature control means. In particular, curves or other technical intermediate components, such as filters, overpressure relief devices, pumps, connecting pieces, flow distributors, flow unifiers, sampling components, certain measurement devices, such as e.g. in-line viscosimeters, flow meters or pressure vessels, may be free from the temperature control means according to the invention. Preferably, connecting pieces with static mixers are used. Insofar as heating should be avoided at these components, specific cooling components can be provided internally or externally.

According to the invention, the critical proportion of heat exchangers (with temperature control means) in a fluid pipeline system was determined with at least 30% of the length, preferably at least 35%, particularly preferably at least 40%, at least 45%, at least 50%, at least 55%, at least 60%, at least 65%, at least 70%, at least 75%, at least 80%, or even at least 85%, at least 90%, at least 95% of the length of the heat exchanger pipeline system being equipped with heat exchangers or temperature control means. A section with a heat exchanger is designated as that longitudinal section of the pipeline system, in which a temperature control means, such as e.g. heat-transfer medium pipelines, is provided. Thus, a large part of the pipeline system is a heat exchanger, thus this aspect of the present invention is also termed a heat exchanger pipeline system. Preferably, a heat exchanger is provided in the heat exchanger pipeline system in sections, at least every 8 m, every 7 m, every 6 m, every 5 m, every 4 m or every 3 m. In these sections of 8 m, 7 m, 6 m, 5 m, 4 m, or 3 m, at least 30% of the length, preferably at least 35%, particularly preferably at least 40%, at least 45%, at least 50%, at least 55%, at least 60%, at least 65%, at least 70%, at least 75%, at least 80%, or even at least 85%, at least 90%, at least 95% of the length of the section is equipped with heat exchangers or temperature control means.

The system according to the invention should homogenise the temperature and pressure distribution during the entire transport of a fluid from the production (e.g. dissolution of the polymer under pressure and/or under vacuum, and heating of the spinning solution to transport temperature, pressurisation in any sequence) through to final processing (shaping in the case of spinning compounds).

For safe process management, it is advantageous to control the specific heat removal capacity (kilowatt per m length, kilowatt per m² of the inner surface). In addition to the previously figures, data, the volumetric heat-flow density of the fluid in kilowatts per m³ of fluid volume of the corresponding plant part is also used as a key safety figure.

It is therefore important that during the processing of thermally sensitive fluids and polymers, the corresponding plant components are configured in such a manner that the thermally sensitive fluid or polymer contained therein can be brought to a safe temperature level, but also a safe temperature distribution over the cross sections of the corresponding plant parts and also the length of the entire system, by means of an actively managed heat management. Polymer melts and polymer solutions generally have structurally viscous properties at high viscosity values, thus in addition to an actively operated heat management, attention is to be paid to a high homogeneity of the polymer flow, so that the same temperature and viscosity profiles are present at all locations in the plant or the plant part. As detailed above, when processing polymer mixtures consisting of cellulose, water and amine oxide, frictional heat is supplied via a plurality of plant components, from the beginning of the solution production through to the shaping, which leads to unchecked and unregulated temperature and viscosity profiles and in extreme cases to exothermic reactions. Thus, the temperature of the fluid is continuously controlled and the fluid is constantly restratified.

The thermally unstable fluid consisting of cellulose/NMMO/water decomposes autocatalytically in the event of unsatisfactory stabilisation, even from temperatures of 120° C. to 130° C. Stabilisation of the fluid is understood as meaning that chemical reagents are already added to the fluid in the course of polymer compound production, which protect the polymer on the one hand and the solvent on the other hand from thermal decomposition. A further addition of the stabilising reagents can also be added in the course of conveying the polymer compound via the heat exchanger pipeline, especially in regions of the heat exchanger system, in which mixing components are also located. In addition to the addition of stabilising reagents, other substances that change product properties can also be added to the heat exchanger system, which during the addition stage can lead to possible heat toning. The heat exchanger system according to the invention can therefore compensate exothermically or endothermically occurring processes very well in the heat exchanger system as a whole. It is understood that with the heat exchanger system, in addition to the addition of fluid substances, one can also introduce gaseous substances. Over-tempered zones, which can manifest themselves as output zones for an exothermic reaction propagating to the entire system, are not formed by the heat exchanger pipeline system according to the invention.

In preferred embodiments, at least one temperature control means of a heat exchanger is a heat-transfer medium pipeline or a heat-transfer medium jacket. It is possible to cool or to heat individual heat exchangers by means of internal temperature control means or by means of external temperature control means. A temperature control jacket surrounds a section at least to some extent in order to heat or cool fluid at the pipeline wall. Which temperature control option is best for a respective system can be calculated easily by a person skilled in the art, taking account of the surface ratio of the temperature control means and possibly the additional frictional heat due to internal mixers and/or temperature control means. It has been established for a cellulose/NMMO/water fluid, that externally cooled heat exchangers are used optimally up to an internal diameter of 35 mm, of 40 mm, of 60 mm or of 90 mm, internally cooled heat exchangers are optimally used from an internal diameter of 135 mm, and internally or externally cooled heat exchangers can be used between 90 mm and 135 mm. In certain embodiments, the heat exchanger pipeline system has a heat exchanger with a temperature control means in the interior of the heat exchanger, preferably for an internal diameter of the heat exchanger of at least 35 mm, of at least 40 mm, of at least 60 mm or of at least 90 mm. Independently of or additionally to that, the heat exchanger pipeline system can contain a heat exchanger with a temperature control means externally to the interior of the heat exchanger, preferably a temperature control jacket, wherein the internal diameter of the heat exchanger is preferably 130 mm at most.

The heat exchanger pipeline system according to the invention can consist of a plurality of sections, in which differently dimensioned heat exchangers are used. Downstream of branching components in particular, a fluid flow can be divided into two or a plurality of flows, in which heat exchangers with smaller internal diameter are usually used. Thus, the invention relates to a heat exchanger pipeline system with a staggered internal diameter of individual heat exchangers. This diameter which is reduced in the course of the pipeline system.

Preferably, the heat exchanger pipeline system has at least 1, 2, 3, 4, 5, 6 or more branching components.

The staggering of the internal diameter of individual sections or heat exchangers of the system according to the invention is preferably in a certain framework. Thus, the internal diameter of a first section of the heat exchanger pipeline system to a second section can amount to at most 5:1, preferably at least 10:9, especially preferably 3:1 to 6:5, particularly preferably 2:1 to 4:3. Specifically, this ratio applies in the case of successive heat exchangers or sections, particularly downstream of distribution components. In particular embodiments, 1, 2, 3, 4, 5, or 6 or more such differently staggered internal diameters may be present.

Preferably, sufficient heat is dissipated in accordance with the volumetric heat flow density ($KW/m^3$) by means of the individual heat exchangers to regulate the temperature and heat management. The linear heat flow density (KW/m) and the surface heat flow density ($KW/m^2$) can be calculated easily by the person skilled in the art form the volumetric heat flow density. Preferably, the heat flow density in fluid lines with an internal diameter of at least 250 mm is at least 120 $KW/m^3$ or more, preferably 263 $KW/m^3$, particularly preferably 442 $KW/m^3$, or 707 $KW/m^3$, or more, insofar as the heat of other parts of the heating pipeline system, such as pumps or filters should be dissipated. Preferably, the heat flow density in fluid lines with an internal diameter of at least 180 mm is at least 40 $KW/m^3$ or 80 $KW/m^3$ or more, preferably 111 $KW/m^3$, particularly preferably 188 $KW/m^3$, or 300 $KW/m^3$, or more, insofar as the heat of other parts of the heating pipeline system, such as pumps or filters should also be dissipated.

Preferably, the heat flow density in fluid lines with an internal diameter of at least 140 mm is at least 30 $KW/m^3$ or more, preferably 80 $KW/m^3$, particularly preferably 103 $KW/m^3$, or 164 $KW/m^3$, or more, insofar as the heat of other parts of the heating pipeline system, such as pumps or filters should also be dissipated.

Preferably, the heat flow density in fluid lines with an internal diameter of at least 110 mm is at least 12 $KW/m^3$ or more, preferably 22 KW/m³, particularly preferably 75 KW/m³, or 120 KW/m³, or more, insofar as the heat of other parts of the heating pipeline system, such as pumps or filters should also be dissipated.

Preferably, the heat flow density in fluid lines with an internal diameter of at least 90 mm is at least 10 KW/m³ or more, preferably 12 KW/m³, particularly preferably 18 KW/m³, or 29 KW/m³, or more, insofar as the heat of other parts of the heating pipeline system, such as pumps or filters should also be dissipated.

Preferably, the heat flow density in fluid lines with an internal diameter of at least 60 mm is at least 10 KW/m³ or more, preferably 11 KW/m³, particularly preferably 17 KW/m³, or 28 KW/m³, or more, insofar as the heat of other parts of the heating pipeline system, such as pumps or filters should also be dissipated.

In preferred embodiments, the minimum dissipated heat flow density (W1) in KW/m³ results from the following formula $$W1=0.0051 \times d^2 - 1.0468 \times d + 63.5,$$

where d is the internal diameter of the heat exchanger in mm (cf. FIG. 7, dotted line).

Preferably, the optimally dissipated heat flow density (W2) in KW/m³ is $$W2=0.0102 \times d^2 - 2.0935 \times d + 127.07$$

(cf. FIG. 7, solid line). The dissipated heat can in special embodiments be at least W1, at least half of W2, at least the mean of W1 and W2, or at least ¾ of W2.

The dissipated heat can be controlled by the choice of temperature control means. In the case of heat-transfer media, heat can be dissipated by means of the choice of the medium and the temperature thereof. Cold water, warm water, cooling oils, thermal oil or other fluids can be used as heat-transfer media in fluid or gaseous consistency. Preferably, the predetermined temperature differences in cross section and/or in the longitudinal direction of the heat exchanger system are at most 5° C., in that corresponding heat exchangers with adjusted length, diameter and temperature control are chosen. Preferably, the predetermined temperature differences in cross section and/or in the longitudinal direction of the heat exchanger system are at most 4° C., at most 3° C., at most 2° C.

The heat exchanger pipeline system can be dimensioned in accordance with wishes and process and design requirements. Preferably, the heat exchanger pipeline system is at least 1 m, preferably at least 2 m, preferably at least 4 m, preferably at least 6 m, preferably at least 8 m, preferably at least 10 m, at least 12 m, at least 14 m, at least 16 m long.

Preferably, the heat exchanger pipeline system is operatively connected to a pump for conveying the viscous medium under pressure, a filter, a pressure and volume compensating tank, an overpressure regulator, measuring device components connected therebetween or combinations thereof or the like. The system should be treated, restratified and temperature controlled or checked as described herein in particular during the entire transport of the fluid from production through to consumption. Such a system can be conveyed via pumps, filters and/or pressure regulators or the like.

In particularly preferred embodiments, the heat exchanger pipeline system according to the invention contains mixing components in the interior, at least of a pipeline section or heat exchanger. As already explained, in the case of small internal diameters in the heat exchanger, internal mixing components and external cooling are preferably to be provided. Mixing components are used for swirling the fluid flow in order to convert a laminar flow into a turbulent flow and/or in order to achieve a fluid exchange from the heat exchanger centre to the cross-sectional outer regions. Preferably, at least 30% of the length, preferably at least 35%, particularly preferably at least 40%, at least 45%, at least 50%, at least 55%, at least 60%, at least 65%, at least 70%, at least 75%, at least 80%, or even at least 85%, at least 90%, at least 95% of the heat exchanger pipeline system is equipped with mixers, particularly static mixing components. In sections with an internal diameter of smaller than 90 mm, preferably of smaller than 130 mm, preferably at least 20% of the length, preferably at least 30%, particularly preferably at least 40%, at least 50%, at least 60%, at least 70%, at least 80%, or even at least 90%, at least 95% of the sections or the individual heat exchangers, are equipped with mixers, particularly static mixing components.

Mixing components can also be provided in sections or individual heat exchangers with internal temperature control, preferably the internal temperature control components have a mixing function at the same time. According to this embodiment, the invention relates to a heat exchanger pipeline system, which has a mixing component as temperature control means, e.g. in the form of a heat-transfer medium pipeline in the interior of the heat exchanger. This can for example be realised by means of correspondingly shaped windings of a heat-transfer medium pipeline. Preferably, in order to prevent frictional heat due to pressure losses, a low packing density is chosen, such as for example a packing density of at most up to 40% of the cross-sectional internal area, which is taken up by the temperature control means, particularly heat-transfer medium pipelines. In some sections of the heat exchanger system, a free cross-sectional area of at most 50%, 65%, 70%, 75% may be expedient. Preferably, the free cross-sectional area is between 5% and 80%, particularly preferably between 10% and 70%, between 15% and 60%, between 20% and 50%, between 25% and 45%, or between 30% and 40%.

The invention also delivers an individual heat exchanger with corresponding packing density for transporting viscous fluids. The heat exchanger pipeline system according to the invention preferably consists of at least one or a plurality of the heat exchangers described as follows. The heat exchanger according to the invention has an outer jacket and one or a plurality of internal heat-transfer medium pipelines. It is characteristic for the invention that the internal heat-transfer medium pipelines have guide regions in the direction of the jacket and wound regions or the heat-transfer medium pipelines are accommodated at least substantially along the entire length of the heat exchanger, particularly in the case of a low packing density of the heat-transfer medium pipelines.

The invention provides a heat exchanger which creates controlled and constant conditions for transporting viscous fluids. Thus, a more even cooling of the transported fluid over the cross section of the heat exchanger is achieved by means of the wound regions according to the invention. By means of the additional accommodation of regions, in which the heat-transfer medium pipelines are guided in the direction of the jacket or by means of the low packing density and thus larger, freer cross-sectional area, it is ensured that the flow of the fluid through the heat exchanger is only minimally impaired. This is particularly critical in the case of viscous fluids, as otherwise high frictional heat and pressure losses occur. In the case of thermally unstable fluids, such as for example cellulosetert. amine oxide solutions, explosions may occur due to these undesired reactions.

In the wound regions, the heat-transfer medium pipelines are guided via one or a plurality of bends, windings or loops. In particular, the wound regions ensure that the heat-transfer medium lines can change between edge regions of the jacket. Preferably, the heat-transfer medium pipelines are essentially guided in a manner offset from the centre or the axis of the heat exchanger, wherein the wound regions can change from one side or edge region to another—not necessarily on opposite sides—and possibly are guided back again or can be guided to a further different side. On the one hand, due to these wound regions, a homogeneous heat transfer is effected; it is also possible to set up a turbulent flow of the fluid, which further promotes the thorough mixing and prevents the formation of viscosity and temperature gradients. A specific advantage lies in being able to dissipate this heat directly by means of the use of heat-transfer medium pipelines as mixing components at the location of the occurrence of frictional heat (dissipation energy due to pressure losses) due to the impact pressure at the pipelines and a heating of insulated fluid regions is prevented from the outset. By these measures, a constant temperature profile of the transported viscous fluid in the cross section of the heat exchanger is achieved and sites of local heating ("hot spots") are prevented. This is a decisive advantage in the case of highly viscous fluids, which can generate considerable counter-pressures and frictional heat as a consequence.

According to the invention, a coolant is conveyed in the heat-transfer medium pipelines during operation. "Heat-transfer medium pipelines" should not be understood as being limited to this use, however, it is also possible to convey heating media or temperature control media in other embodiments. The temperature control means in general and also the heat-transfer medium can be used both for cooling and for heating the fluid, depending on whether the temperature of the temperature control means is higher or lower than the temperature of the fluid. In the heat exchanger pipeline system, the temperature of the temperature control means can also be controlled in such a manner that certain sections of the system act as cooling sections and other sections act as heating sections. "Regions" are generally understood herein as meaning regions in the interior of the heat exchangers, which are suitable for conveying a fluid. For the most part these are pipeline regions. "Pipeline region" is herein understood as meaning a section with a certain length along the heat exchanger. "Edge regions" are delimited cross-sectional areas of the heat exchanger at a certain pipeline region in the vicinity of the external jacket.

In order to keep the heat transfer between the heat exchanger or the heat exchanger pipeline system and the surroundings thereof as low as possible, it is possible to provide in a further advantageous configuration that the heat exchanger or the system is enclosed at least in certain sections by a heat-insulation layer. As a result, more targeted temperature checking of the fluid in the interior can be better effected.

In preferred embodiments, at least two heat-transfer medium pipelines are provided. These heat-transfer medium pipelines can be set up for conveying heat-transfer medium in the opposite direction. The at least two heat-transfer medium pipelines are guided inside the jacket in the heat exchanger, e.g. parallel at least in certain regions. Thus, for example the sections, in which the heat-transfer medium pipelines are guided along the heat exchanger, i.e. along the jacket as non-wound regions, may be present in the same pipeline regions or alternately. Preferably, the wound regions of at least two heat-transfer medium pipelines are present together in a delimited pipeline section. One or a plurality of heat-transfer medium pipelines can be connected at an end region to a second heat-transfer medium pipeline for returning heat-transfer medium in these second heat-transfer medium pipelines. By means of the return flow of the heat-transfer medium pipelines, it is possible for single connection ends to be enabled for supply and removal in spatial proximity. In addition, it is prevented that temperature drops arise along the heat exchanger due to heating of the coolant during the through-flow through the heat exchangers. This is particularly advantageous in the case of long heat exchangers, e.g. with a length of several metres, in particular.

The wound regions of at least two heat-transfer medium pipelines can additionally be present together in a delimited pipeline section such that the same are entwined with respect to each other. This effects a particularly efficient thorough mixing of the fluid and homogeneous heat transfer with the coolant. By means of the efficient mixing through the heat-transfer pipelines, it is possible to dispense with further mixing components along the heat exchanger, including static mixing components, the essential task of which is to effect a turbulent flow—often whilst generating a considerable counter-pressure. The heat exchanger can therefore be essentially free of additional mixing components in sections with heat-transfer medium pipelines.

Specifically, the wound regions are provided for swirling the viscous fluid. Particular shapes or windings of the coolant pipelines for increasing turbulence are known per se and can be used to this end.

Preferably, in the heat exchanger pipeline system according to the invention, at least 1, 2, 3, 4, 5, 6, 7, 8, 9, 10, 11, 12 or more individual heat exchangers are provided as described herein or otherwise known. The system according to the invention stands out in particular due to the modular use of a multiplicity of individual heat exchangers.

In preferred embodiments, one or a plurality of overpressure relief devices, preferably overpressure devices based on rupture components, are provided in the heat exchanger pipeline system. The use of overpressure relief devices is generally known. Conventional means for example comprise rupture discs, which have a membrane, which bursts under the action of a pressure that is higher than normal operating pressure but lower than the pressure that would break a pipe or vessel itself, as a result of which a pressure relief is enabled with an exterior space. Rupture discs are for example described in U.S. Pat. Nos. 6,241,113, 3,845,879, US 2008/0202595, EP 1 591 703 and U.S. Pat. No. 7,870, 865. Some rupture discs can have perforations, in order to ensure that they break open at several points or along predetermined breaking points. Rupture discs can be used in the most diverse of devices, which seek to check the action of the rupture discs. Thus, U.S. Pat. No. 4,079,854 describes a device, which has a cutting apparatus with a blade, which tears a concave rupture disc after the action of pressure. U.S. Pat. No. 3,872,874 describes a rupture disc device with a convex rupture disc, which is pressed against a cutting spike in the event of pressure expansion. WO 2005/054731 relates to a rupture disc arrangement with a pressure detector. EP 789 822 relates to a pressure safety device for thermally unstable viscous compounds, such as cellulose solutions, in which a rupture component penetrates into the interior of a transport pipe. U.S. Pat. No. 5,337,776 relates to a pipe with an overpressure relief device, wherein a rupture disc lies flush in the inside of the wall of the pipe, so that a rinsing of the rupture disc is effected with transported liquid.

Preferably, the overpressure relief devices are provided with the temperature control means in connecting elements between regions of the individual heat exchangers. According to the invention, the sections with temperature control means effect an exceptionally efficient temperature and, connected therewith, pressure check of the conveyed fluid, so that no overpressure relief devices are necessary in these sections. As the heat exchangers equipped with temperature control means according to the invention form an exceptionally efficient temperature and viscosity homogenisation, the installation of overpressure relief devices can deliberately be avoided in these zones, as the same create a cold spot in the heat exchanger system and thus severely disrupt the heat management of the heat exchanger pipeline. Overpressure relief devices are therefore primarily provided on connecting elements, in which an internal temperature control means is not conveyed. Alternatively, mixing components can be provided in the regions of the overpressure relief devices, so that these devices are contacted with homogeneous fluid. The temperature of the overpressure relief devices can also be controlled by temperature control means.

By means of the designs of a heat exchanger pipeline system according to the invention, particularly long pipelines can be provided, which allow cooling over the entire length. This is particularly relevant when transporting highly viscous spinning solutions, in which a number of metres can be bridged between reactor and extruder or the like. Exemplary plants require a pipeline of approx. 20 metres. Preferably, long heat exchanger pipelines of at least 1 m, preferably at least 2 m, at least 3 m, at least 4 m, at least 5 m, at least 6 m, at least 7 m, at least 8 m, at least 9 m, at least 10 m, at least 12 m, at least 15 m, length are provided. A plurality of heat exchangers, i.e. sections with separate, delimited temperature control means, can be provided along the heat exchanger pipeline system. The heat-transfer pipelines of individual heat exchangers can be supplied separately with coolant. Preferably, the pipeline contains 1, 2, 3, 4, 5, 6, 7, 8, 9, 10 or more heat exchangers. Individual heat exchangers have the heat-transfer medium pipelines according to the invention and can have dimensions of 0.2 to 4 m, preferably from 0.3 to 3 m, especially preferably from 0.4 to 2 m, particularly preferably from 0.5 to 1 m. The heat exchanger interior of individual heat exchangers is preferably open at both ends and enables the connection of further heat exchangers or other components, such as connecting pieces, flow dividers, filters, pumps, pressure vessels or end devices, such as extruders and spinning devices.

Preferably, the heat-transfer medium pipelines are accommodated at least along 60%, especially preferably at least along 65%, at least along 70%, at least along 75%, at least along 80%, at least along 85%, at least along 90%, at least along 95% of the length of one or a plurality, particularly all heat exchangers of the system according to the invention.

The heat exchanger pipeline system according to the invention is preferably operatively connected together with a pump for conveying the viscous medium under pressure. Particularly when transporting highly viscous fluids, which are pressed into the system through the heat exchangers under pressure, the advantages of the present invention stand out particularly clearly.

In order to create a counter-pressure that is as low as possible, the viscous fluids are transported through the heat exchangers with as little resistance as possible. To this end, the packing density of the temperature control means is reduced. In particular, in preferred embodiments, in the cross section of the heat exchangers, at most up to 50%, preferably up to 45%, up to 40%, up to 35%, up to 30%, up to 25%, up to 20%, up to 15%, up to 12%, up to 10%, up to 8%, up to 7%, up to 6%, up to 5%, of the cross-sectional internal area is taken up by the temperature control means. That is to say, the free cross section is the remaining cross-sectional portion free for the throughflow of the fluid and is preferably at least 50%, especially preferably at least 55%, at least 60%, at least 65%, at least 70%, at least 75%, at least 80%, at least 85%, at least 90%.

A heat exchanger with inner temperature control means can have a plurality of regions with wound heat-transfer medium pipelines. In downstream wound regions of the heat-transfer medium pipelines, the heat-transfer medium pipelines are preferably twisted or angled with respect to one another. The downstream wound regions can for example be formed by a returning heat-transfer medium pipeline or by a heat-transfer pipeline, in which the coolant is conveyed in the opposite direction to a first heat-transfer medium pipeline.

The heat-transfer medium pipelines and/or the heat exchangers can be produced from various materials, such as steel, high-grade steel, ceramic, sintered metals, aluminium, plastic, non-ferrous metals or noble metals. Preferred materials are all irons, iron alloys, nickel chromium steels, nickel steels (e.g. Hastelloy materials), titanium, tantalum, silicon carbide, glass, ceramic, gold, platinum and also plastics. Specific materials are alloys with a high molybdenum content, or nickel, chromium and molybdenum alloys for resistance to rust penetration and crevice corrosion or nickel copper alloys with high tensile strength. Material examples are Hastelloy C (high corrosion resistance), Hastelloy B (precipitation hardening high-temperature alloy), Inconel (resistance to stress corrosion cracks in petrochemical applications), Incoloy (high strength and also resistance to high temperatures and to oxidation and carburising), Monel (high tensile strength, resistant to corrosion). The heat-transfer medium pipelines and/or the heat exchangers can however also be produced from coated materials.

Knowing the corrosion resistance of the construction materials used, the person skilled in the art can decide for the heat exchanger system, with respect to the fluid to be conveyed, which construction materials can be used and how the heat exchanger system can be constructively connected to a plant unit. In a heat exchanger system used for temperature and viscosity homogenisation of the polymer compounds consisting of cellulose, amine oxide and water, attention is to be paid to freedom from iron and non-ferrous metals.

Preferably chosen is a material with a thermal conductivity of 5 to 100 W/mK, especially preferably from 10 to 60 W/mK. In special embodiments, the jacket of a heat exchanger is insulated and/or can be provided as a double pipe, as the heat exchange takes place in the interior and no substantial external heat transport has to occur via the jacket.

Furthermore, the invention relates to a method for transporting a viscous fluid through a heat exchanger pipeline system according to the invention or a heat exchanger according to the invention. Likewise, the invention relates to the use of the heat exchanger pipeline system or heat exchanger for transporting a viscous fluid. Preferably, the viscous fluid is thermally unstable. Thermally unstable fluids are for example biopolymer solutions, cellulose solutions, such as cellulose/amine oxide solutions, specifically solutions of tertiary amine oxide solutions. An example is a cellulose NMMO solution, as described in WO 94/28213 A1. The fluid can be an aqueous solution. Thermally unstable fluids are those for which there is the risk of a temperature increase during transport through the heat exchanger and the plant system. Temperature increases can arise e.g. owing to exothermic reactions, particularly chemical reactions, or owing to frictional heat during the transport of highly viscous fluids. Further fluids are in particular technical plastics, fluids that can set, particularly "hot melts", such as polymers, polycarbonates, polyesters, polyamides, polylactic acid, propylene, etc. The fluid can be a thixotropic fluid, particularly a spinning solution. Specific fluids have a melting temperature of at least approx. 40° C., at least 50° C., at least 55° C., at least 60° C., at least 65° C., at least 70° C., at least 75° C., but can also reach melting temperatures of up to 280° C. The fluid can be conveyed at exemplary temperatures of at least 40° C., at least 50° C., at least 55° C., at least 60° C., at least 65° C., at least 70° C., at least 75° C., at least approx. 80° C., at least 85° C., at least 90° C., at least 95° C. The present invention can be used in order to dissipate the heat from exothermic reactions or dissipation energy due to friction/pressure losses of the viscous fluid.

In preferred embodiments, a coolant is conveyed through the heat-transfer medium pipeline (internally or externally, e.g. in the jacket, to a heat exchanger), which deviates by at most 20° C., preferably at most 15° C., at most 12° C., at most 10° C., at most 9° C., at most 8° C., at most 7° C., at most 6° C., at most 5° C., at most 4° C., at most 3° C., from the temperature of the transported viscous fluid. The heat exchanger according to the invention has proved efficient such that small temperature differences are possible with satisfactory heat dissipation. Preferably, the temperature of the coolant is lower than that of the fluid.

In special embodiments, viscous fluids are transported at high pressures of at least 15 bar, at least 20 bar, at least 25 bar, at least 100 bar, preferably at least 200 bar, at least 300 bar, at least 400 bar, at least 500 bar, at least 600 bar, at least 700 bar, at least 800 bar, output pressure through the heat exchangers or the pipeline system. In further embodiments, the heat exchanger pipeline system or an individual heat exchanger according to the invention, or the overpressure device is set up for transporting fluids at high pressures (triggering pressure) up to a maximum of 1000 bar, preferably up to 60 bar, up to 80 bar, up to 120 bar, up to 250 bar, up to 350 bar, up to 450 bar, up to 550 bar, up to 650 bar, up to 750 bar, up to 900 bar. Preferably, the zero shear viscosity of the fluid is in the range from 100 to 15,000 Pas, particularly between 500 to 10,000 Pas.

In preferred embodiments, the present invention is defined as follows:

1. A heat exchanger pipeline system for transporting viscous fluids with a multiplicity of, e.g. 2, 3, 4, 5, 6, 7, 8 or more, individual heat exchangers as pipeline components and with a predetermined controlled temperature and/or pressure distribution along the pipeline system, and also in the cross section of the pipelines, characterised in that at regular spacings along the pipeline system, heat exchangers are provided as pipeline components, wherein the regular spacings are chosen in such a manner in order to maintain a predetermined temperature and/or pressure distribution by restratifying the fluid along the pipeline system, wherein temperature control means in the heat exchangers for the viscous fluids transported in the heat exchanger pipeline, and also optionally mixing components in order to maintain a predetermined temperature and/or pressure distribution in the cross section of the pipelines, depending on the pipeline cross section, are provided, and wherein at least 30% of the length of the heat exchanger pipeline system is equipped with heat exchangers.

2. The heat exchanger pipeline system according to Definition 1, characterised in that at least one temperature control means of a heat exchanger is a heat-transfer medium pipeline or a heat-transfer medium jacket.

3. The heat exchanger pipeline system according to Definition 1 or 2, with a staggered internal diameter of individual heat exchangers, which is reduced in the course of the pipeline system.

4. The heat exchanger pipeline system according to one of Definitions 1 to 3, with at least one branching component.

5. The heat exchanger pipeline system according to one of Definitions 1 to 4, wherein the internal diameter of a first section of the heat exchanger pipeline system to a second section amounts to at most 5:1, preferably at least 10:9.

6. The heat exchanger pipeline system according to one of Definitions 1 to 5, with a heat exchanger with a temperature control means in the interior of the heat exchanger, preferably for an internal diameter of at least 90 mm of the heat exchanger.

7. The heat exchanger pipeline system according to one of Definitions 1 to 6, with a heat exchanger with a temperature control means externally to the interior of the heat exchanger, preferably a temperature control jacket, wherein the internal diameter of the heat exchanger is 130 mm at most.

8. The heat exchanger pipeline system according to one of Definitions 1 to 7, characterised in that the predetermined temperature differences in cross section and/or in the longitudinal direction of the heat exchanger system are at most 5° C.

9. The heat exchanger pipeline system according to one of Definitions 1 to 7, containing mixing components in the interior of at least one pipeline section.

10. The heat exchanger pipeline system according to Definitions 6 and 9, wherein the mixing component and temperature control means are a heat-transfer medium pipeline in the interior of the heat exchanger.

11. The heat exchanger pipeline system according to Definition 10, characterised in that the internal heat-transfer medium pipeline has guide regions in the direction of the jacket and the wound regions.

12. The heat exchanger pipeline system according to one of Definitions 1 to 11, characterised in that the heat exchanger pipeline system is at least 1 m, preferably at least 2 m, preferably at least 4 m, preferably at least 6 m, preferably at least 8 m, preferably at least 10 m long.

13. The heat exchanger pipeline system according to one of Definitions 1 to 12, characterised in that the temperature control means are accommodated along at least 60% of the length of the heat exchanger pipeline system.

14. The heat exchanger pipeline system according to one of Definitions 1 to 13, characterised in that the same is operatively connected together with a pump for conveying the viscous medium under pressure, a filter, an overpressure regulator, a processing device for processing the polymer solution, such as spinning devices or extrusion devices, or combinations thereof or the like.

15. The heat exchanger pipeline system according to one of Definitions 1 to 14, with a heat-transfer medium pipeline in the interior of the heat exchanger, wherein in the cross section of the heat exchanger, up to 40% of the cross-sectional internal area is taken up by the heat-transfer medium pipelines.

16. A heat exchanger for transporting viscous fluids, with an external jacket and one or a plurality of internal heat-transfer medium pipelines, particularly coolant pipelines, characterised in that the internal heat-transfer medium pipelines have guide regions in the direction of the jacket and wound regions, wherein two heat-transfer medium pipelines are preferably provided, which are preferably set up for guiding the heat-transfer medium in the opposite direction.

17. The heat exchanger according to Definition 16, characterised in that a heat-transfer medium pipeline can be connected at an end region to a second heat-transfer medium pipeline for returning the heat-transfer medium in this second heat-transfer medium pipeline.

18. The heat exchanger according to Definition 16 or 17, characterised in that the wound regions of at least two heat-transfer medium pipelines are present together in a delimited pipeline section.

19. The heat exchanger according to Definition 16 or 18, characterised in that the wound regions of at least two heat-transfer medium pipelines are present together, distorted with respect to each other, in a delimited pipeline section.

20. The heat exchanger pipeline system according to one of Definitions 15 to 19, characterised in that the wound regions are set up for swirling the viscous fluid.

21. The heat exchanger according to one of Definitions 15 to 20, characterised in that the heat exchanger is at least 1 m, preferably at least 2 m, preferably at least 4 m, preferably at least 5 m long.

22. The heat exchanger according to one of Definitions 15 to 21, characterised in that the heat-transfer medium pipelines are accommodated at least along 50% of the length of the heat exchanger.

23. The heat exchanger according to one of Definitions 15 to 22, characterised in that the same is operatively connected together with a pump for conveying the viscous medium under pressure.

24. The heat exchanger according to one of Definitions 15 to 23, with low heat-transfer medium pipeline packing density, wherein at most up to 40% of the cross-sectional internal area is taken up by the heat-transfer medium pipelines.

25. The heat exchanger according to one of Definitions 15 to 24, characterised in that the downstream wound regions of the heat-transfer medium pipelines are twisted or angled with respect to one another as viewed in cross section.

26. The heat exchanger pipeline system according to one of Definitions 1 to 14, wherein at least one section of the system consists of a heat exchanger according to one of Definitions 15 to 25.

27. A method for transporting a viscous fluid through a heat exchanger pipeline system or a heat exchanger according to one of Definitions 1 to 26, particularly wherein the viscous fluid is thermally unstable and preferably is a cellulose solution.

28. A method for transporting a viscous fluid through a heat exchanger pipeline system or a heat exchanger according to one of Definitions 1 to 27, particularly wherein the viscous fluid is thermally unstable, preferably is a cellulose solution comprising or consisting of cellulose and an organic solvent.

29. A method for transporting a viscous fluid through a heat exchanger pipeline system or a heat exchanger according to one of Definitions 1 to 28, wherein the viscous fluid is a cellulose solution comprising or consisting of cellulose, amine oxide and water, preferably wherein the amine oxide is N-methylmorpholine N-oxide.

30. A method for transporting a viscous fluid through a heat exchanger pipeline system or a heat exchanger according to one of Definitions 1 to 26, wherein the viscous fluid is a cellulose solution and the dissolved cellulose is present in the solution in the form of a derivative of the cellulose.

31. A method for transporting a viscous fluid through a heat exchanger pipeline system or a heat exchanger according to one of Definitions 1 to 26, wherein the viscous fluid is a biopolymer solution and the dissolved biopolymer constitutes a bio-based plastic.

32. A method for transporting a viscous fluid through a heat exchanger pipeline system or a heat exchanger according to one of Definitions 1 to 26, wherein the viscous fluid is a biopolymer solution and the dissolved biopolymer is present in the form of polysaccharides, proteins, nucleic acids.

BRIEF DESCRIPTION OF THE DRAWINGS

The present invention is illustrated further by means of the following figures and examples, without being limited to these specific embodiments of the invention.

(C): After the solution production of the cellulose polymer solution, the transfer of the compound to a filter, passing through the filter and also further transfer for processing to form a moulding (extrusion) are carried out. In the case of the course of the curve C, only the dissipation heat of the heat exchanger is dissipated.

(D): After the solution production of the cellulose polymer solution, the transfer of the compound to a filter, passing through the filter and also further transfer for processing to form a moulding are carried out. In the case of the course of the curve D, not only the dissipation heat of the heat exchanger is dissipated, which here contributes to temperature and viscosity homogeneity, but rather also the dissipation of that caused by pressurisation pumps and also the heating caused by the filtration is dissipated.

As can be seen from curve (D), a temperature and viscosity homogeneity is achieved over the transport path, over the entire heat exchanger pipeline cross-sectional area and also over the heat exchanger pipeline volume. In addition, a homogenisation of the compound temperature is achieved over the entire heat exchanger pipeline course.

(E): With the system according to the invention, the control of the fluid temperature can also be undertaken in such a manner that in the event of a desired temperature increase of the fluid, the heat exchanger pipeline is dimensioned in such a manner with respect to pressure loss, that the desired temperature increase is introduced at the heat exchanger by means of frictional heat. Due to the constructive design of the heat exchanger pipeline as an indirectly guided heat exchanger, in addition to the heat introduced at the heat exchanger by means of friction, heat for increasing the temperature of the cellulose solution can also be introduced by means of a heat exchanger fluid fed to the heat exchanger pipeline.

Figure 7:
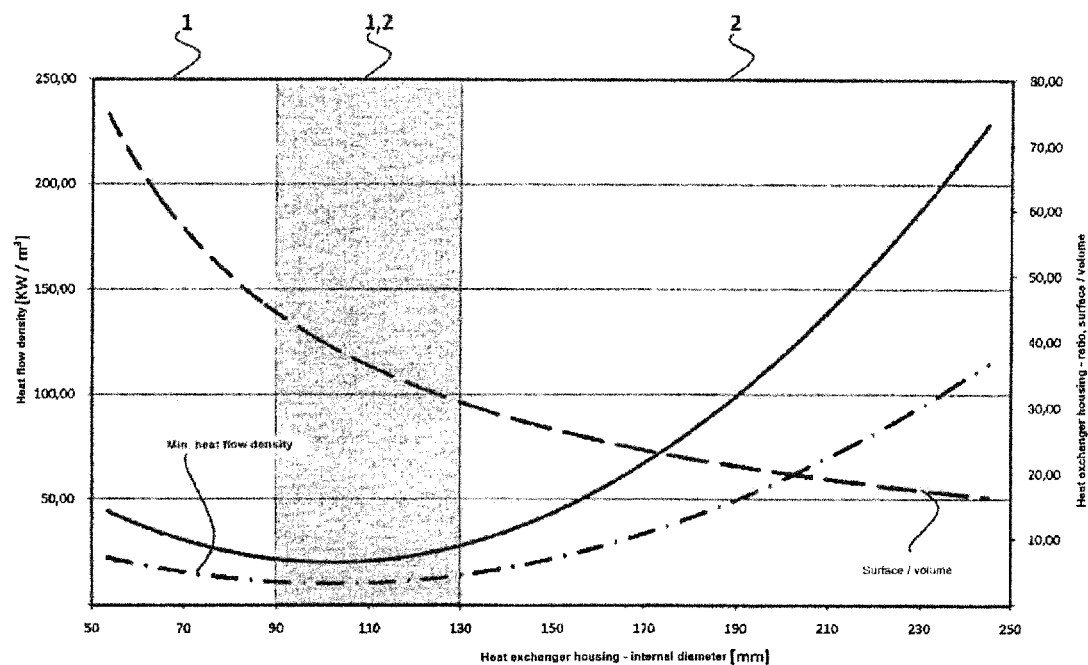

FIG. 7 shows a calculation of heat to be dissipated as a function of the heat exchanger diameter/surface.

In addition, selected regions are specified with regards to heat flow density of individual heat exchangers, wherein optimum regions for different heat exchangers lie
  in region 1: pure static mixers in the interior with external temperature control by means of temperature control means on the jacket of the heat exchanger
  in region 2: pipe static mixers with internal temperature control
  in region 1, 2: region, in which static mixers or alternatively pipe static mixers lie. The line "min. heat flow density" shows the minimum heat to be dissipated, in order e.g. to remove frictional heat arising by means of the pipe and the mixer in the cellulose/NMMO/water fluid mixture at a set temperature of 95° C. The solid line shows the optimally dissipated heat quantity.

Figure 8A:
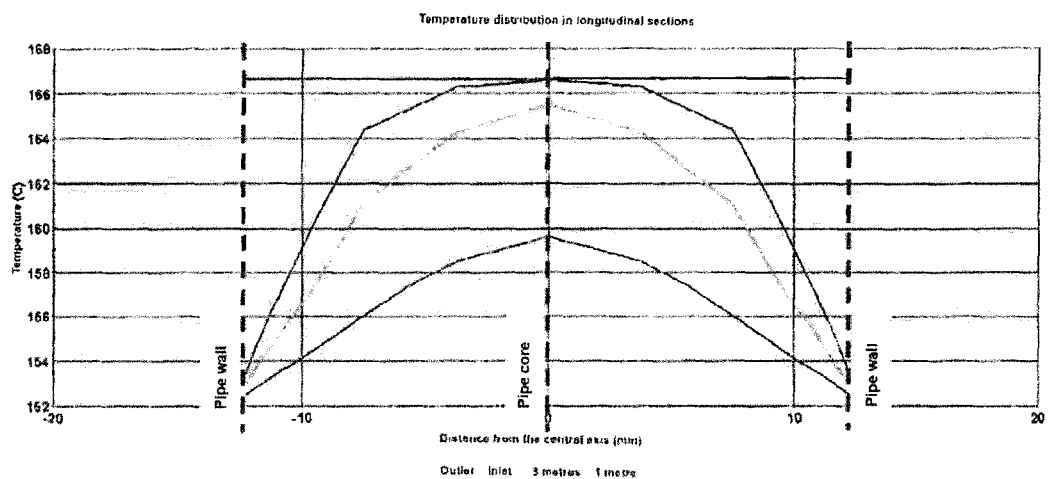
Figure 8B:
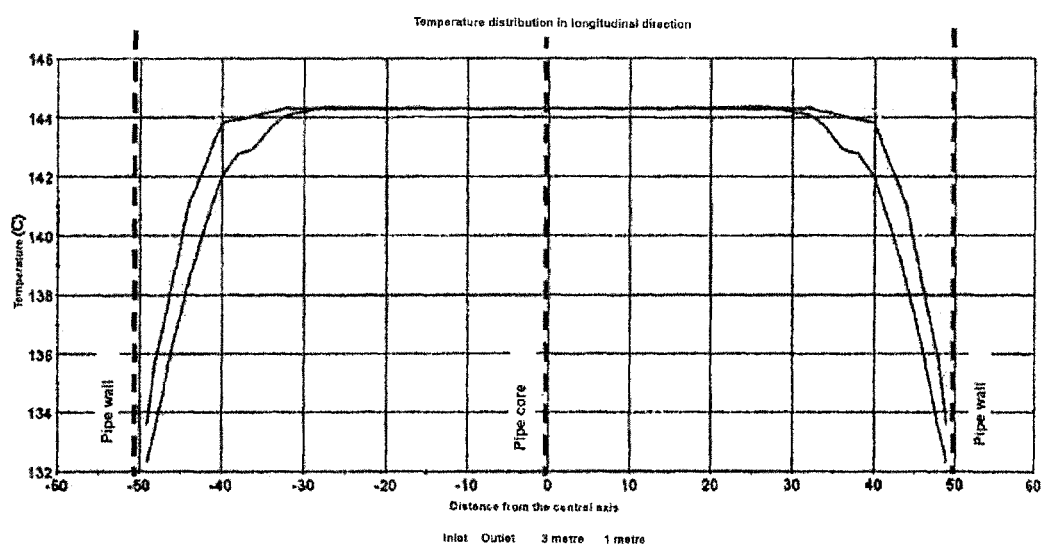

FIG. 8 shows the cross-sectional temperature profiles for pipes without a heat exchanger, through which fluid flows. FIG. 8a: Pipe with 25 mm diameter; FIG. 8b Pipe with 100 mm diameter. The temperature curves from top to bottom show the profile 1) at the inlet, b) after 1 m, c) after 3 m, and d) at the outlet (after 10 m).

DETAILED DESCRIPTION

Examples

Figure 1:
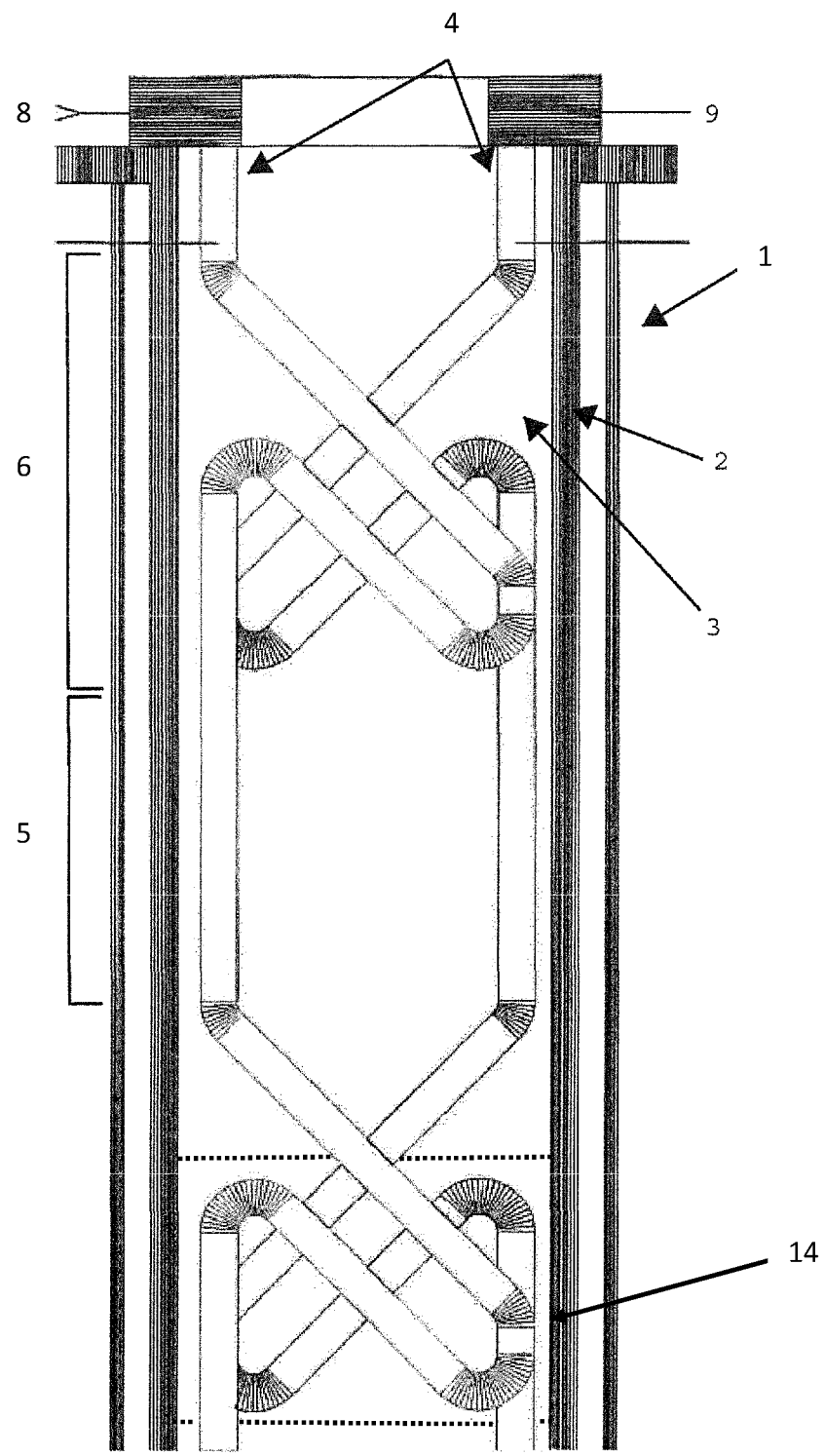
FIG. 1 shows a longitudinal section through a heat exchanger 1 according to the invention with an external jacket 2 and an inner region 3 and internal coolant pipelines 4, which have guide regions 5 in the direction of the jacket and wound regions 6.
Figures 2A, 2B:
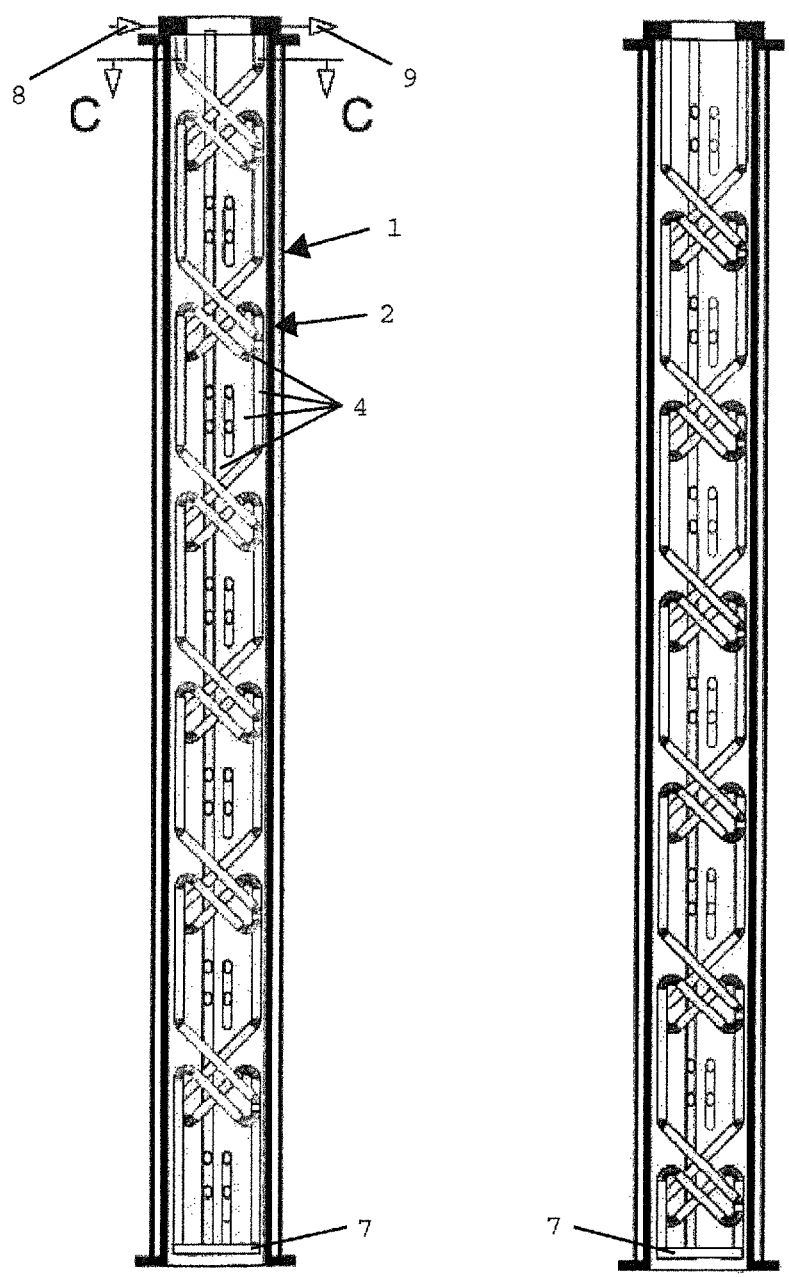
FIGS. 2a, 2b and 2c show three sections through a heat exchanger according to the invention, two normal longitudinal sections, FIG. 2a (Section A-A) and FIG. 2b (Section B-B) and a cross section, FIG. 2c (Section C-C) with two crossed coolant pipelines in a wound region in each case. The coolant pipelines are connected to one another by means of connecting pipelines 7, so that the coolant can be returned in each second coolant pipeline. Likewise shown are a coolant inlet 8 and outlet 9.
Figure 2C:
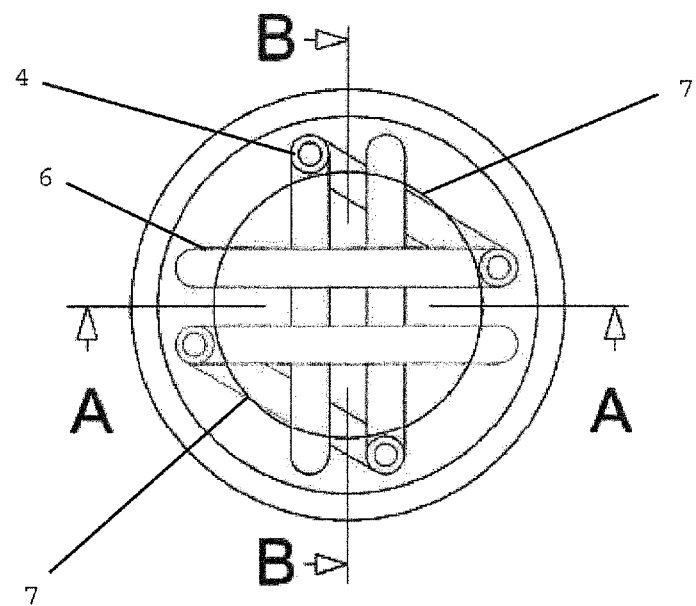
Figure 3:
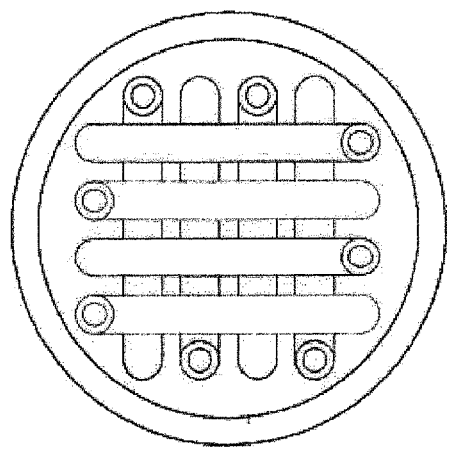
FIG. 3 shows a cross section through a heat exchanger 1 with four crossed coolant pipelines 4 in a wound region 6 in each case.
Figure 4:
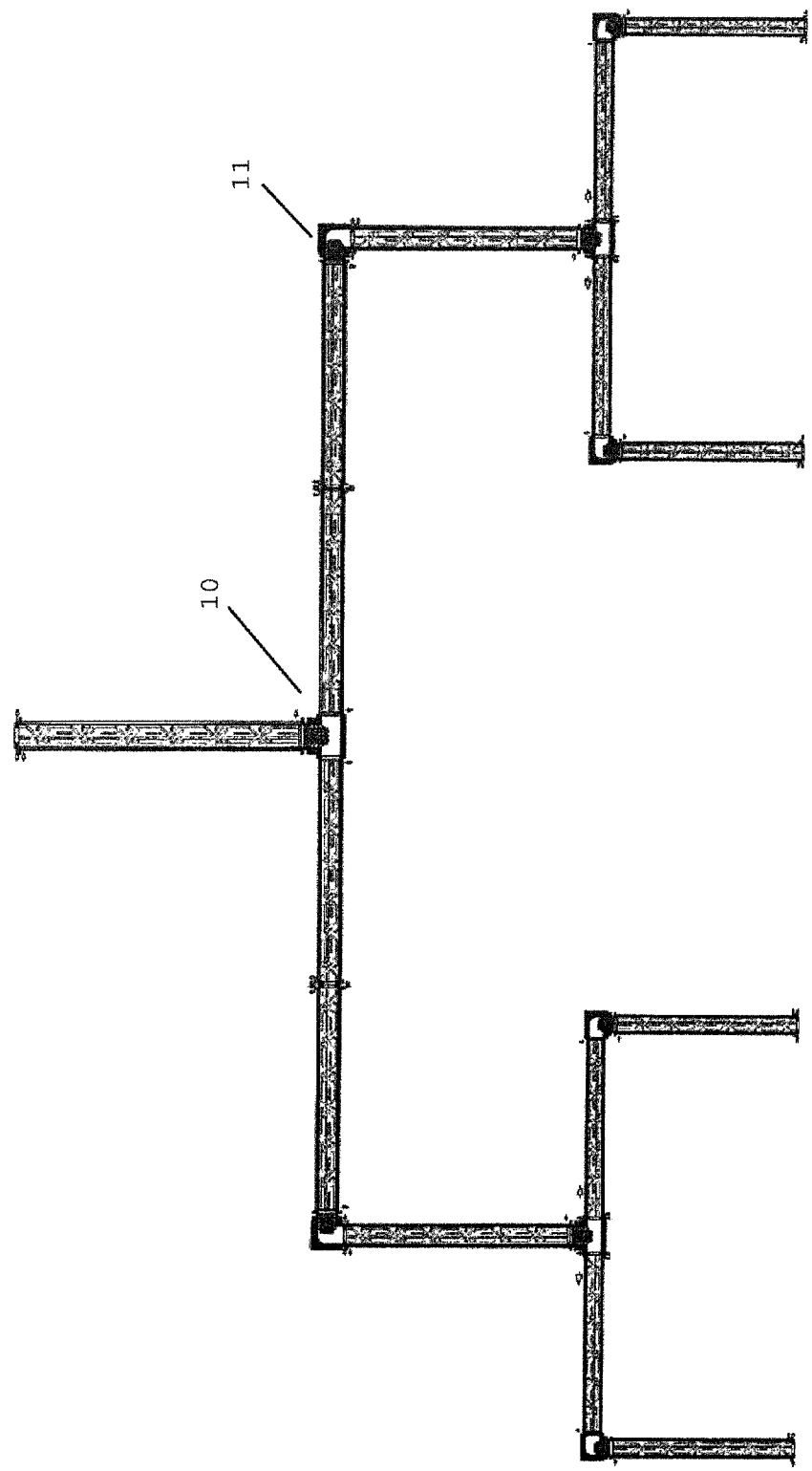
FIG. 4 shows a heat exchanger pipeline branched by fluid divider 10, wherein individual pipeline sections are connected via bent parts 11.
Figure 5:
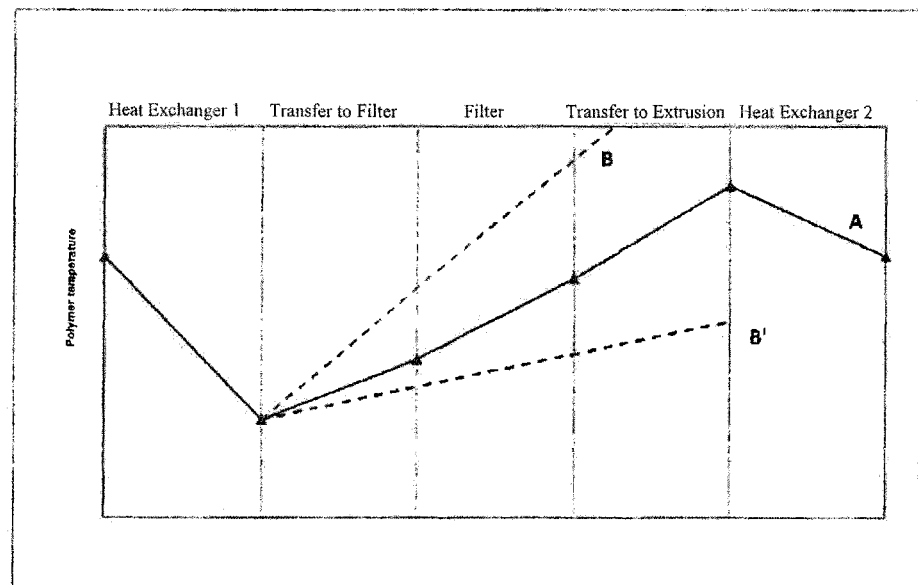
FIG. 5 shows a comparison of the temperature gradients in a conventional fluid pipeline system, as described in WO 94/28213 A1, and the temperature check according to the invention. The one polymer (cellulose) temperature scatter in sections of a transport pipe, which is not a heat exchanger, is shown. The course of the curve (a) describes the average temperature course such that following solution production, the polymer compound is cooled via a heat exchanger, is subsequently fed into a pipe and transported for processing (extrusion). The pressure losses resulting as a consequence of mass transport and also filtration and diverse deflections lead to heat being introduced into the polymer compound by means of the friction, as a result of which, the temperature level as a whole is raised. The curves B—pipe centre—and B'—pipe wall—represent an analysis of the teaching according to WO 94/28213 A1, according to which, only the wall of a pipe is cooled. It can be seen that the temperature inhomogeneity increases with distance from the solution production to processing, thus over the transport in the pipe, which can be expressed in a spread of the two curves (B) and (B'). WO 94/28213 A1 teaches that a temperature spread of up to 15° C. can occur owing to the pipe system, which is autonomous with respect to temperature and heat management. It becomes clear from the teaching of WO 94/28213 that large viscosity differences are set and build up due to the permitted temperature spread in the conveyed polymer or cellulose solution. If this temperature and viscosity homogeneity is not overcome, then production faults inevitably occur at the downstream processing positions for moulded products, which faults have the effect that extrudates tear off during spinning or extrusion, adhere to other extrudates and as a result unusable end products are created.
Figure 6:
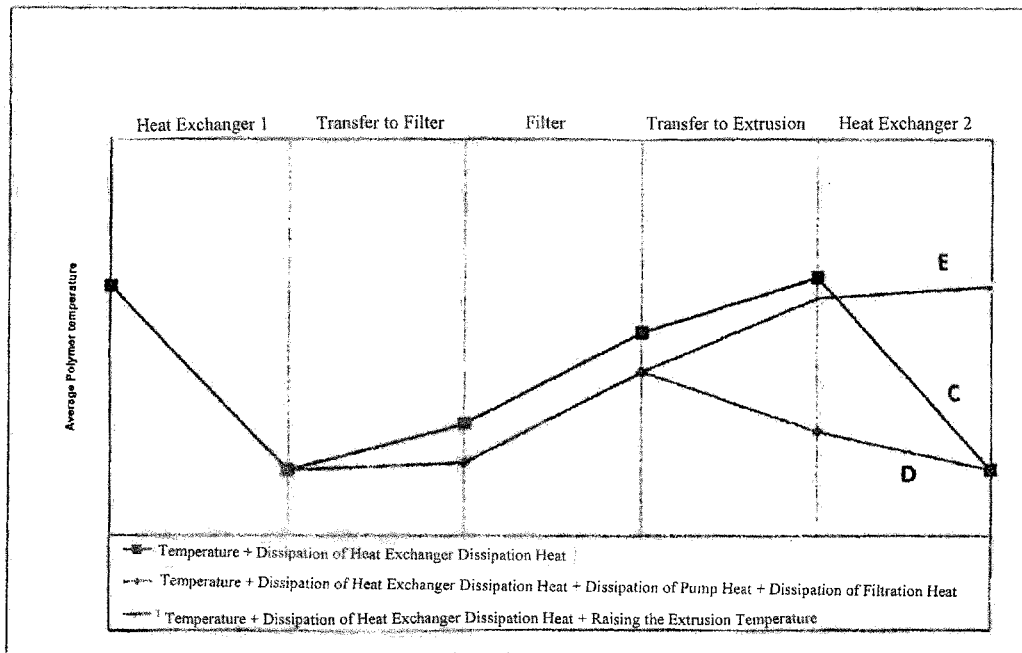
FIG. 6 shows the temperature curve of cellulose solutions in various plant configurations, wherein 3 different temperature curves (C, D, E) are illustrated.

According to these examples, a heat exchanger pipeline as illustrated in FIG. 2 is used. In this form, a heat exchanger contains four coolant pipelines, wherein in each case two are attached at the end for returning the coolant. At the other end, connectors for introducing and draining the coolant are provided. The heat exchanger interior is open at both ends and enables the connection of further heat exchangers or other components, such as connecting pieces, flow dividers, filters, pumps, pressure vessels or end devices, such as extruders or the like. Connections of this type are illustrated in FIG. 3. The coolant pipelines are accommodated in the interior of the heat exchanger, wherein in each case two have wound regions with crossed pipeline loops in the same section or as a consequence have guide regions in the direction of the jacket in a further section. These regions change alternately. Offset thereto is a further pair of coolant pipelines, which both have wound regions and non-wound regions likewise in the same sections, wherein with reference to the first cooling pipeline pair, these wound and non-wound regions are present in a mirrored manner.

Example 1

A heat exchanger pipeline according to FIG. 3 with a cellulose/NMMO/water solution was tested during operation. A spinning solution made up of various sulphite celluloses (Manufacturer MoDo, Sappi Saiccor), composed of 12.9% cellulose, 76.3% amine oxide (NMMO) and 10.8% water, was produced in a dissolution apparatus at a temperature between 97° C. and 102° C.

At a density of 1200 kg/m$^3$, the solution had a zero shear viscosity (at 85° C.) of 15,000 Pas. The thus-obtained spinning solution was adjusted to a temperature of 95° C. after the production in a heat exchanger equipped with heated internal static mixer components (Model: Sulzer SMR).

At the heat exchanger output, the temperature of the solution delivered was determined, wherein the following temperatures were measured:
T1=95.8° C.
T2=96.7° C.
T3=96.1° C.
T4=95.2° C.
T5=97.1° C.

It can be seen from the measured temperatures that a temperature difference of approx. 1.9° C. was achieved over the cross section of the heat exchanger.

Example 2—Empty Pipe Experiment

Continuing, the cellulose solution delivered from the heat exchanger was conveyed into an empty pipe with internal diameter of 108 mm (length approx. 3 metres).

For further processing, the spinning solution flow was divided into 2 individual flows with empty-pipe internal diameter of 80 mm (length approx. 2 metres).

The empty pipes were externally provided with a temperature-control jacket with a thermal insulation (50 mm insulation thickness) thereabove.

The temperature-control jacket was kept at a temperature of 82° C.

After the transport path in the empty pipes (length 5 metres), the temperature distribution of the spinning solution over the cross section was determined at one of the two outlets (65 mm), wherein the following temperatures were measured:
T1=97.8° C. (measured in pipe centre)
T2=91.7° C.
T3=83.5° C.
T4=89.2° C.
T5=91.1° C.

It can be seen from the measured temperatures that a temperature difference of approx. 14.3° C. was achieved over the cross section of the empty pipe. It is noticeable that in spite of the low jacket temperatures, a very high core temperature was measured, which can be explained by a pronounced shear heating of the fluid.

Example 3—Heat Exchanger with Heated Internal Static Mixer Components

The invention is set the goal of having to keep the temperature and viscosity constance of the spinning solution at a uniform level over the course of the pipe, in spite of the thermostatting from outside and the entry of shear heat. In order to achieve this, the above-listed empty-pipe system is replaced by means of a heat exchanger system.

The heat exchanger system consists of at least mutually connected heat exchangers.

The first heat exchanger (housing internal diameter 108 mm, length 3 m) consisted of a housing with heated internal static mixer components (Model: Sulzer SMR). The temperature control jacket of the housing was connected to the internal static mixer components, wherein the temperature of the temperature control medium has been set to 92° C.

The internal static mixer components had a length of 2 m (approx. 65% of the housing length).

Downstream of the first heat exchanger component, the spinning solution was subjected to a temperature measurement, wherein the following temperatures are set after passage through the heat exchanger:
T1=94.8° C.
T2=94.4° C.
T3=95.1° C.
T4=95.6° C.
T5=95.9° C.

It can be seen from the measured temperatures that a temperature difference of approx. 1.1° C. was achieved. It is noteworthy that by means of the design according to the invention, a very uniform spinning solution can be set with respect to temperature and viscosity distribution and at the same time, the shear heating of the fluid induced in the heat exchanger system can be dissipated.

Example 4—Heat Exchanger with Internal Static Mixer Components

After the distribution of the spinning solution flow, the cellulose solution was transported via 2 structurally identical heat exchangers connected in parallel.

Both heat exchangers (housing internal diameter 85 mm-length 2 m) consisted of a housing with internal static mixer components (Model: Sulzer SMXL). The temperature-control jacket of the housing was set to a temperature of 90° C.

The internal static mixer components had a length of 1.2 m (approx. 60% of the housing length). Downstream of one of the two heat exchanger components, the spinning solution was subjected to a temperature measurement, wherein the following temperatures are set after passage through the heat exchanger:
T1=95.3° C.
T2=96.7° C.
T3=95.4° C.
T4=96.1° C.
T5=95.5° C.

It can be seen from the measured temperatures that a temperature difference of approx. 1.4° C. was achieved. It is noteworthy that by means of the design according to the invention, a very uniform spinning solution can be set with respect to temperature and viscosity distribution and at the same time, the shear heating of the fluid in the heat exchanger system can be dissipated.

Based on the data for the temperature spread, the minimum and optimum heat exchanger lengths in a fluid conveying system were calculated. For a maximum spread of 1.5° C. of a cellulose/NMMO/water fluid at 95° C. in a system made up of 20 individual heat exchangers of 1 m length in each case with staggered internal diameters of 175 mm, 136 mm, 108 mm, 85 mm, and 65 mm, at least 34% of the entire length of the transport system from the first pump to an extruder, is conveyed via a filter and a further pump, a heat exchanger. Within the individual heat exchanger components, it is not the entire length that is provided with a heat-transfer medium pipeline, rather, considering connecting pieces and if appropriate incomplete equipment, with heat exchangers with 175 mm internal diameter, 56.9% of the length, optimally 73.1% of the length is provided with heat-transfer medium. In heat exchangers with 136 mm internal diameter, 69.2% of the length, optimally 85.8% of the length is provided with heat-transfer medium. In heat exchangers with 108 mm internal diameter, 61.7% of the length, optimally 86.7% of the length is provided with heat-transfer medium. In heat exchangers with 85 mm internal diameter, 63.6% of the length, optimally 84.1% of the length is provided with heat-transfer medium. In heat exchangers with 65 mm internal diameter, 50.0% of the length, optimally 75.0% of the length is provided with heat-transfer medium.

Heat exchangers with 175 to 108 mm internal diameter are internally temperature controlled, heat exchangers with internal diameters of 85 to 65 mm are externally temperature controlled with internal static mixers.

For the entire length of the heat exchanger system, based on the sum of the length portions of the heat exchangers, 61.5% of the length, optimally 81.0% of the length is provided with heat-transfer medium. In the case of required distribution components, filters and pumps, 97.1% of the length can be provided with heat-transfer medium.

Example 5

A polymer solution—to be used as a spinning solution and with the following composition—was transferred from spinning solution production through to processing of the same at a spinning machine through a heat-exchanger pipeline system consisting of heat exchangers and connecting pieces with rupture components (as distribution pieces).

The spinning compound consisting of a mixture of cellulose of the type MoDo Crown Dissolving DP 510-550 and Sappi Saiccor DP 560-580 were produced continuously with the following composition, cellulose 12.9%; amine oxide (NMMO) 76.3%; water 10.8%.

The solution production took place after aqueous enzymatic pretreatment and suspension production by evaporating excess water under vacuum in a continuously perfused reaction vessel at a temperature of 97 to 103° C. had taken place. Known stabilisers were added to stabilise the solvent NMMO/water. The stabilisation of the cellulose solution takes place, as is known, using propyl gallate. For safety-conscious solution production, the heavy metal ion content is checked and a value of 10 ppm as sum parameter (made up of metal ions and noble metal ions) is not exceeded.

The density of the solution produced is 1,200 kg/m³ at room temperature. The zero shear viscosity of the spinning compound set by means of the cellulose mixing components can be up to 15,000 Pas, measured at 75° C. Depending on the processing temperature chosen in the spinning process, the zero shear viscosity can shift in the range from 500 to 15,000 Pas. Due to the structurally viscous behaviour of the spinning solution, the viscosity falls for spin shear rates, depending on the chosen processing temperature, to a range of below 100 Pas and is likewise heavily dependent on the cellulose concentration in the spinning solution.

At the connecting piece, polymer compound was removed for temperature measurement and viscosity measurement at sampling openings during the passage, wherein the rupture discs attached in the connecting piece were dimensioned for a specific throughflow per mm².

129.9° C. for the pipe with 100 mm diameter (according to WO 94/28213). The density of the fluid was 1200 kg/³, the heat capacity was 2700 J/kgK and the thermal conductivity was modelled as linear function of the temperature (0.23 to 0.24 W/mK).

In a first calculation pass, the possibility of influencing the fluid temperatures by means of the diameter of the pipe without heat input (not decomposition reaction in the fluid) was simulated.

The cross-sectional temperature profile of the pipe with 25 mm is depicted in FIG. 8a. The temperature curves from top to bottom show the profile 1) at the inlet, b) after 1 m, c) after 3 m, and d) at the outlet (after 10 m). It is evident that, by means of the jacket, the pipe can also be cooled in the pipe centre.

The cross-sectional temperature profile of the pipe with 100 mm is depicted in FIG. 8b. The temperature curves are shown analogously to FIG. 8b, wherein the differences can only also be seen at the edge region of the pipe. It is evident that, by means of the jacket, the pipe cannot be cooled in the

| Sampling opening via distribution piece | Spec. Rupture disc dimensioning kg polymer compound/mm² rupture disc area | Temperature ° C. | Temperature deviation +/− in ° C.* | Viscosity $\eta_0$ in Pas at 90° C. | Viscosity deviation $\eta_0$ in Pas at 90° C. +/− |
|---|---|---|---|---|---|
| Reactor | 0.11 | 101.5 | 2.4 | 1270 | 98 |
| Downstream of heat exchanger | 0.08 | 96.5 | 0.8 | 2080 | 85 |
| Downstream of filter | 0.05 | 97.3 | 1.3 | 1550 | 73 |
| Downstream of pump-distribution | 0.15 | 95.8 | 0.9 | 2200 | 67 |
| Distribution-spinning machine | 0.04 | 91.5 | 1.1 | 3650 | 54 |

Deviations with respect to temperature and viscosity were determined via 10 individual measurements and by forming the average.

Comparative Example: Simulated Heat Transfer of Viscous Fluids in Pipes without Internal Heat Exchanger Pipes with temperature checking, as in WO 94/28213 without internal heat exchanger for assessing the heat transfer simulated from the pipe centre to pipe wall for the throughflow of highly viscous fluids (such as cellulose solutions).

The temperature cross section profile was measured at the inlet (length 0 m), after 1 m, 3 m and at the outlet (length 10 m). Pipes with diameters of 25 mm and 100 mm formed the basis of the investigation. Flow speeds in accordance with typical values for highly viscous media were chosen (1.13 m/min for diameter 25 mm and 3.54 m/min for diameter 100 mm). At the inlet of the measuring region, the speed distribution is imposed constantly over the cross section as a plug. The simulations are all carried out in a laminar manner. The wall temperature was 152.7° C. for the pipe with 25 mm, and pipe centre. The core temperature of the fluid can be influenced by the wall temperature which is lower by approx. 15° C.

Consequently, for fluids of this type, an alternative cooling and thorough mixing is required, as was provided according to the present invention.

The invention claimed is:

1. A heat exchanger pipeline system for transporting a viscous fluid, comprising:
a heat exchanger pipeline configured for transporting the viscous fluid, the viscous fluid having a viscosity of at least 500 Pas:
a plurality of heat exchangers that are serial pipeline components positioned at regular intervals in said heat exchanger pipeline and selected to maintain a predetermined temperature and pressure distribution along said heat exchanger pipeline, wherein the plurality of heat exchangers each include an internal diameter, wherein the internal diameter of a first heat exchanger of the plurality of heat exchangers is greater than the internal diameter of a second, successive heat exchanger of the plurality of heat exchangers;

a temperature controller in the heat exchangers for controlling a temperature of the viscous fluid; and mixing components configured to maintain at least one of the predetermined temperature and pressure distribution in a cross section of the heat exchanger pipeline, wherein at least 30% of a length of said heat exchanger pipeline is equipped with the heat exchangers.

2. The heat exchanger pipeline system according to claim 1, wherein the temperature controller is a heat-transfer medium pipeline or a heat-transfer medium jacket.

3. The heat exchanger pipeline system according to claim 1, wherein a ratio of the internal diameter of the first heat exchanger to the internal diameter of the second, successive heat exchanger is 10:9 to 5:1.

4. The heat exchanger pipeline system according to claim 1, further comprising at least one branching component.

5. The heat exchanger pipeline system according to claim 1, wherein an internal diameter of one of the plurality of heat exchangers is at least 90 mm.

6. The heat exchanger pipeline system according to claim 1, wherein the temperature controller is external to the heat exchangers and is a temperature control jacket, wherein the internal diameter of each of the heat exchangers is less than 130 nm.

7. The heat exchanger pipeline system according to claim 1, wherein a predetermined temperature difference in at least one of a cross section and a longitudinal direction of the heat exchanger pipeline is less than or equal to 5° C.

8. The heat exchanger pipeline system C according to claim 1, wherein the mixing components and the temperature controller are in at least one of the plurality of heat exchangers in an interior of the heat exchanger pipeline.

9. The heat exchanger pipeline system according to claim 8, further comprising a jacket, wherein the at least one of the plurality of heat exchangers has guide regions and wound regions.

10. The heat exchanger pipeline system according to claim 1, wherein the heat exchanger pipeline is at least 10 m long.

11. The heat exchanger pipeline system according to claim 1, wherein the temperature controller is accommodated along at least 60% of the length of the heat exchanger pipeline.

12. The heat exchanger pipeline system according to claim 2, wherein less than or equal to 40% of a cross-sectional internal area of each of the heat exchangers is taken up by the heat transfer medium pipeline.

13. A method for transporting a viscous fluid through a heat exchanger pipeline system according to claim 1, wherein the viscous fluid is at least one of a cellulose solution and a biopolymer solution, selected from polysaccharides, proteins, nucleic acids or mixtures thereof.

14. The heat exchanger pipeline system according to claim 1, wherein the viscosity is at least 10,000 Pas.

15. A heat exchanger pipeline system for transporting a viscous fluid, comprising:

a heat exchanger pipeline configured for transporting the viscous fluid, the viscous fluid having a viscosity of at least 500 Pas;

a plurality of heat exchangers that are serial pipeline components positioned at regular intervals in said heat exchanger pipeline and selected to maintain a predetermined temperature and pressure distribution along said heat exchanger pipeline, wherein the plurality of heat exchangers each include an internal diameter, wherein the internal diameter of a first heat exchanger of the plurality of heat exchangers is greater than the internal diameter of a second, successive heat exchanger of the plurality of heat exchangers;

a temperature controller in the heat exchangers for controlling a temperature of the viscous fluid;

a plurality of pipes in each of the plurality of heat exchangers, wherein the pipes are arranged in wound regions, in which the pipes are wound about each other, and guide regions, in which the pipes are substantially straight, wherein the guide regions separate the wound regions, and wherein at least 30% of a length of said heat exchanger pipeline is equipped with the heat exchangers.

* * * * *

UNITED STATES PATENT AND TRADEMARK OFFICE
CERTIFICATE OF CORRECTION

PATENT NO. : 10,557,668 B2
APPLICATION NO. : 14/241631
DATED : February 11, 2020
INVENTOR(S) : Zikeli et al.

Page 1 of 1

It is certified that error appears in the above-identified patent and that said Letters Patent is hereby corrected as shown below:

In the Claims
In Column 23, Line 25, please delete "nm" and replace with --mm--
In Column 23, Line 30, please delete "C"

Signed and Sealed this
First Day of September, 2020

Andrei Iancu
*Director of the United States Patent and Trademark Office*